United States Patent [19]
August

[11] 3,793,830
[45] Feb. 26, 1974

[54] DEVICE FOR THE AFTER TREATMENT OF EXHAUST GASES OF AN INTERNAL COMBUSTION ENGINE

[76] Inventor: Paul August, Capellades 1, Barcelona 6, Spain

[22] Filed: May 19, 1972

[21] Appl. No.: 255,182

[52] U.S. Cl. .................. 60/288, 23/288 F, 60/289, 60/301
[51] Int. Cl. ............................................. F01n 3/14
[58] Field of Search ..... 60/288, 274, 301, 289, 290; 23/288 F; 423/213, 214

[56] References Cited
UNITED STATES PATENTS

| | | | |
|---|---|---|---|
| 2,071,119 | 2/1937 | Harger | 60/288 |
| 3,282,046 | 11/1966 | Walker | 60/288 |
| 3,338,682 | 8/1967 | Fowler | 60/288 |
| 3,397,034 | 8/1968 | Tulleners | 60/301 |
| 3,611,715 | 10/1971 | Tatsutomi | 60/290 |
| 3,662,540 | 4/1972 | Murphey | 60/290 |

FOREIGN PATENTS OR APPLICATIONS

| | | | |
|---|---|---|---|
| 1,216,496 | 11/1959 | France | 60/288 |
| 1,946,862 | 4/1971 | Germany | 60/288 |

*Primary Examiner*—Douglas Hart
*Attorney, Agent, or Firm*—Albert L. Jeffers; Roger M. Rickert

[57] ABSTRACT

A device for the treatment of exhaust gases leaving an internal combustion engine in which a main flow passage for the gases is surrounded by another passage having therein axially arranged treatment chambers containing catalyst material. The main flow passage is provided with a flow control valve which, at low engine speeds, diverts substantially all of the exhaust gases to the outer passage surrounding the main flow passage, while at higher speeds the valve deflects and permits an ever increasing amount of the exhaust gases to pass through the main flow passage. The main flow passage and the outlet end of the outer passage containing the catalyst chambers are coaxially arranged and taper inwardly so that there is a mingling of the gases from the passages at the discharge end of the device. The device is adapted for direct connection to the exhaust manifold of an engine and can be incorporated directly therein.

11 Claims, 3 Drawing Figures

DEVICE FOR THE AFTER TREATMENT OF EXHAUST GASES OF AN INTERNAL COMBUSTION ENGINE

The present invention is concerned with a method and apparatus for treatment of the exhaust gases leaving an internal combustion engine to reduce the oxides of nitrogen therein, while also diminishing the amounts of carbon monoxide and hydrocarbon compounds in the exhaust gases.

The problem of emissions from an internal combustion engine is a serious matter and many different approaches to the problems of reducing undesirable emissions from the internal combustion exhaust gases have been made. The proposed solutions to this problem have, however, introduced other problems and there has not, heretofore, been any satisfactory method and apparatus proposed for exhaust gas treatment.

Catalytic after combustion units, or afterburners, are known which direct the exhaust gases from an engine through catalytic material to effect treatment of the gases. Such units sometimes involve a valve arrangement which at a certain temperature or, after a certain engine speed has been reached, will bypass the exhaust gases around the treatment device. In particular, in this type of a device, the disadvantage exists that after a certain point is reached, no further treatment of the gases takes place.

In another type of afterburner arrangement, all of the exhaust gases are treated but at a certain point, a portion only of exhaust gases are treated. Such devices represent an improvement over the devices which bypass the entire flow of exhaust gases around the treatment device at a certain point but are, nevertheless, effective in respect of the possibility of not properly treating the gases while power losses occur in the use of the devices.

With the foregoing in mind, a primary object of the present invention is to provide a method and apparatus for the treatment of exhaust gases from an internal combustion engine which eliminates the drawbacks referred to above that have characterized such methods and apparatus according to the prior art.

Another object of this invention is the provision of a method of, and a device for the treatment of exhaust gases from an internal combustion engine in which the exhaust gases are always substantially completely detoxified from the time that the engine is at idling speed until it is operating at full load.

A still further object of the present invention is the provision of a method of, and device for, the treatment of internal combustion exhaust gases in which little power is lost and in which substantially complete detoxification of the exhaust gas is effected while only a portion thereof are subjected to the action of the catalytic material in the device.

A still further object of the invention is the provision of a method of, and a device for, the treatment of exhaust gases from an internal combustion engine which is efficient in operation and which utilizes the heat of the exhaust gases to promote efficient operating conditions.

A still further object of the present invention is the provision of a method and device of the nature referred to in which fresh air is employed in combination with the device to provide for efficient operating conditions thereof.

The foregoing objects, as well as still other objects and advantages of the present invention will become more apparent upon reference to the following detailed description taken in connection with the accompanying drawings, in which:

FIG. 1 is a longitudinal sectional view, somewhat schematic in rendition, through a device according to the present invention.

FIG. 2 schematically illustrates one control arrangement for use with the device.

FIG. 3 schematically illustrates another control arrangement for use with the device.

BRIEF SUMMARY OF THE INVENTION

The arrangement of the present invention is particularly adapted for use with engines which have mixture controlling devices on the fuel inlet side so that at constant driving speeds, such as are normally encountered on the highway, the carbon monoxide in the exhaust gases is not more than about 0.4 percent, while the hydrocarbon compounds in the exhaust gases are not more than about 60 parts per million. Such engines create a fuel air mixture, which is highly efficient in the combustion process within the engine and which produce a waste gas discharge from the engine containing about two to four per cent oxygen.

The exhaust gases from an engine of the internal combustion type contain oxides of nitrogen, carbon monoxide, and hydrocarbon compounds, all of which are objectionable and which it is desirable to reduce to a minimum.

The present invention proposes to reduce the objectionable compounds in such exhaust gases by disposing a unit according to the present invention close to the engine, even directly connected to the exhaust manifold of the engine, or incorporated therein, so that the exhaust gases reach the device in extremely hot condition, whereby the thermal and catalytic treatment of the gases will commence quickly after the engine has been started and will take place while the engine is warming up from a cold condition. This is important because the emissions, at least from carbon monoxide and hydrocarbon, from an internal combustion engine are at the very worst when the engine is cold and is first started.

The device of the present invention has a central main passage or channel for the exhaust gases and an outer passage or channel containing two serially arranged annular chambers for catalytic material which surround the main central channel and are in heat exchange relation therewith. The main channel has a control element at the upstream end thereof which is adjustable for deflecting a controlled amount of the exhaust gases through the outer channel and the chambers therein containing the catalytic material, while downstream from the control element the main channel is constructed as a thermal reactor and is in heat transfer relation with the chambers containing the catalytic material. Because of this quite efficient after combustion takes place even starting with a cold motor. Further, the high degree of efficiency of the device permits it to be installed in a small space so that the device can readily be attached directly to the exhaust manifold of the engine, or even incorporated directly therein.

In a preferred embodiment of the invention, the portion of the main flow channel downstream from the deflecting valve includes mixing devices on the wall thereof which maintain the exhaust gases flowing along the thermal reactor portion of the main flow channel in a turbulent condition, and in this way provide for a complete mixing of the gases and good heat transfer conditions.

According to the present invention, it is preferable to employ two serially arranged catalyst chambers, each containing catalytic material and interposed therebetween a chamber with mixing elements therein. In this manner, the compounds in the exhaust gases are selectively subjected to treatment with a mixing step for the gases interposed between the serially arranged chambers.

The first catalytic material encountered by the exhaust gases may advantageously be a catalytic material which reduces the oxides of nitrogen, while the second encountered catalytic material may be a material which oxidizes carbon monoxide and hydrocarbon compounds in the exhaust gases. It has been found that the division of the catalytic material into two chambers, as described, is effective for promoting efficient treatment of the exhaust gases.

At the discharge end of the device where the stream of exhaust gas from the main channel mixes with the stream of gas from the outer channel containing the serially arranged catalyst chambers, it is advantageous to taper both the main channel and the outer channel inwardly so that the gas streams therefrom become thoroughly admixed and any oxygen in the gases at this point will induce further combustion in the hot gases.

In this region of the device, mixing devices can also be provided, such as protrusions on the outside of the discharge end of the main channel.

It is also proposed to supply additional air to the device to enhance the treatment of the exhaust gases and it is proposed to supply the air upstream of the first chamber for catalytic material up to the time the engine reaches a predetermined temperature, while thereafter the additional air is supplied to the upstream end of the second chamber for catalytic material.

In this manner the device can be caused to commence efficient operation quite quickly after a cold engine has been started which, as mentioned, is extremely important in respect of controlling engine emissions.

The aforementioned supply of additional combustion air may be accomplished by the use of an electrically operated air pump which will automatically pump air and increase its pressure up to that corresponding to a predetermined vehicle speed or a predetermined temperature.

It is preferable for the chambers containing the catalytic material to be provided with external heat insulating jacket means in order to conserve heat and lead to efficient operation of the device. On the other hand, the wall defining the main flow channel, and also defining the radially inner wall of the annular chambers for receiving catalytic material, should be of good heat conductive material thereby to provide for efficient transfer of heat between the inner and outer channels. To this end, the wall of the main flow channel may include protrusions thereon extending into the catalytic material.

The device is advantageously provided with controls, one of which holds the deflector valve closed to cause all of the exhaust gases to pass along the outer channel and through the chambers containing the catalytic material. This will cause the catalytic material to heat up rapidly and become operative in the shortest length of time when starting up a cold motor. The control includes heat sensitive control means sensitive to the temperature of the catalytic material, or to the temperature of the engine, or to the temperature of the engine cooling fluid, for releasing the deflecting valve to open the main channel when the proper conditions have been reached to permit flow through the main flow channel.

Still another control device is connected to the deflecting valve and is operable to bring about complete opening of the deflector valve when the catalytic material becomes overheated. This is an important feature because overheating of the catalytic material can lead to destruction thereof within a relatively short time and this can occur in the event of faulty engine operation.

DETAILED DESCRIPTION OF THE INVENTION

Figure 1:
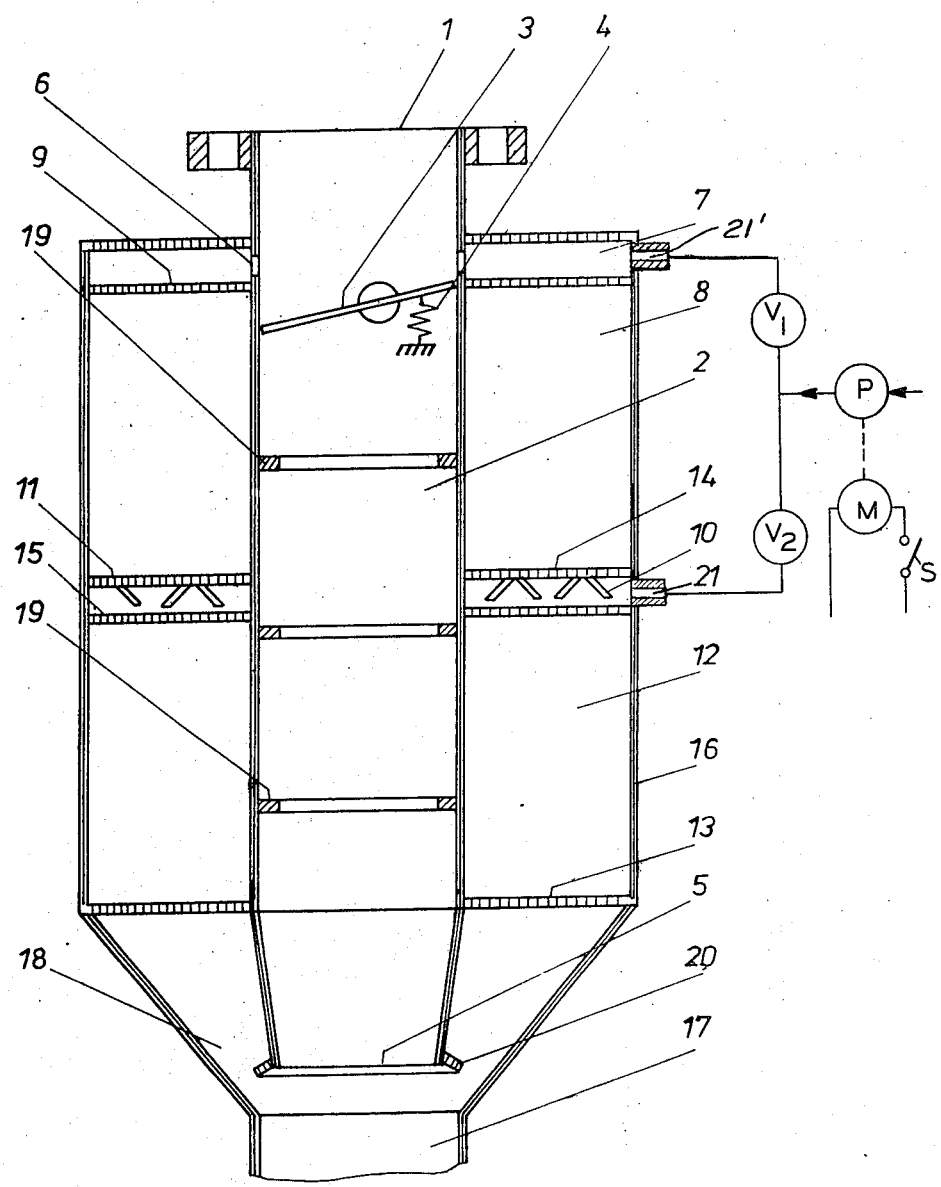

Referring now to the drawings somewhat more in detail, numeral 1 designates the inlet to a main flow channel 2 formed, for example, by a metal pipe. Near the inlet end of main channel 2 is a deflecting valve in the form of a butterfly valve 3 mounted on an off-center shaft so that the gas pressure ahead of the valve tends to open the valve. A biasing spring 4 connected to butterfly valve 3 urges it toward closed position. Near the discharge end, channel 2 is tapered inwardly, as indicated by reference numeral 5, so that the discharge end of the main channel has a smaller diameter than the inlet end.

Upstream from butterfly valve 3 are openings 6 opening radially outwardly through the pipe forming the main channel and communicating with an annular chamber 7 at the upstream end of the outer channel. Immediately adjacent annular chamber 7 in the downstream direction is an annular chamber 8 containing catalytic material. A perforated metal sheet 9 separates chambers 7 and 8. Immediately downstream from annular chamber 8 is a mixing chamber 10 having mixing elements 11 therein to mix gases flowing therethrough. Chamber 10 is separated from chamber 8 by a perforated metal sheet 14.

Downstream from chamber 10, and separated therefrom by a perforated metal sheet 15, is a still further chamber 12 also containing catalytic material and closed at the bottom by a perforated metal sheet 13. All of the aforementioned chambers, and especially chambers 8 and 12, are delimited at the radially inner sides thereof by the pipe making up main channel 2 and are thus in good heat exchange relation therewith.

The external jacket member 16 delimiting the catalytic chambers on the radially outer side tapers off conically inwardly at its lower end and is connected with an exhaust tube, or pipe, 17. The end of the main flow channel and the conically tapered off end of jacket 16 define an annular slit 18 and projecting into this slit is a ring 20 mounted on, for example, the outside of the tapered portion of the main flow channel and serving for mixing the gases flowing through slit 18 and immediately downstream thereof.

Advantageously, main channel 2 downstream from butterfly valve 3, comprises internal rings 19 for creating turbulence in the gases passing along the main channel.

In operation, hot exhaust gases enter inlet 1 and butterfly valve 3 remains closed up to an engine speed corresponding to about 50 miles per hour of a vehicle powered by the engine. Thus, up to about this speed, the exhaust gases all pass through openings 6 into chamber 7 and then through perforated sheet 9 into chamber 8 where the oxides of nitrogen in the exhaust gases are reduced.

From chamber 8, the gases pass through perforated metal sheet 9 into chamber 10 and are caused to mix therein and then pass through perforated sheet 15 into catalyst chamber 12, which contains a catalytic material which brings about oxidation of the carbon monoxide and the hydrocarbons in the exhaust gases. Thereafter, the exhaust gases pass through perforated metal sheet 13 and along the inwardly tapering end of jacket 16 into exhaust tube, or pipe, 17.

If the engine speed exceeds that referred to, butterfly valve 3 will commence to open due to the gas pressure on the upstream side thereof and a portion of the exhaust gases will pass along main flow channel 2. Spring 4 is so selected that the butterfly valve 3 will be completely opened at about three-quarter engine load or at a slightly greater load but certainly before the engine comes up to a full load.

Even with butterfly valve 3 completely open, however, due to the inwardly tapered exhaust end of main flow channel 2 about 5 percent up to about 15 percent of the gases will pass through the catalyst chambers. Thus, treatment of the gases by the catalytic material in the catalyst chambers never come completely to a halt. As opposed to devices according to the prior art, the device according to the present invention never becomes overheated even at high engine loads. Such overheating is disadvantageous because the catalytic material becomes defective at high temperatures and can even be destroyed.

According to the present invention, thus, under full engine load, only a portion of the exhaust gases, say up to 15 percent thereof is catalytically treated, while the remainder is subjected to after burning in a thermal reactor.

In the described manner, there are created conditions in which total aftercombustion takes place throughout the range of loads to which the engine is subjected. The power loss of the device is quite small and efficient operating conditions are maintained throughout the range of engine loads. The thermal reactor is quite efficient because it is well insulated toward the outside and the heat from the thermal reactor is supplied to the catalytic material in order to heat the catalytic material at the proper operating temperature.

The rings 19 in the thermal reactor create turbulence in the outer portion of the exhaust gases flowing along the main channel so that the exhaust gases are thoroughly admixed without encountering high flow resistances and unburned carbon monoxide and at least portions of the hydrocarbons therein will encounter free oxygen and be burned.

The aforementioned outer ring at the extreme end of main flow channel 2 and projecting into slit 18 causes the hot gases which have undergone catalytic treatment to become turbulent and, since the gases flow toward the center of pipe 17, they become intimately mixed with the gases from the flow channel 2 for efficient aftercombustion thereof.

Additional air for the treatment process can advantageously be introduced by way of conduit 21 opening into chamber 10. According to the present invention, it has been discovered that, when starting with a cold engine, it is advantageous to supply the additional air upstream from the catalyst chamber 8, for example, to point 21'.

For efficient treatment of the exhaust gases, the treatment must occur as rapidly as possible after the starting of the engine. Thus, the catalytic treatment of the carbon monoxide and of the hydrocarbons must occur within thirty seconds of the time the engine is started in order to provide for satisfactory treatment. A cold engine will start quickly and run trouble free only when it is supplied with an excess of fuel and under these conditions produces more carbon monoxide and hydrocarbons than when the engine is hot. Thus, when the engine is cold and first starting up it is of advantage to introduce the additional air at point 21, or upstream thereof until both of the bodies of catalytic material have gone into an efficient operation.

The reasons for the foregoing, is that the mass of engine material ahead of the exhaust gases must first be brought to a temperature of about 200° centigrade before any treatment of the exhaust gases commences. Thus, it is of advantage for the oxidation of the carbon monoxide and hydrocarbons to take place as closely as possible to the engine outlet so that the highest temperature conditions are present. Thus, it is of advantage to employ the first catalytic material in chamber 8 also for the treatment of the exhaust gases to oxidize the carbon monoxide and the hydrocarbons until the engine comes up to temperature.

When the engine is cold the oxides of nitrogen will, in any case, by present only in small amounts but will increase as the engine temperature increases. Thus, when the engine temperature and the bodies of catalytic material have reached certain temperatures, the added combustion air is switched from upstream of chamber 8 to point 21 where the added air will be of advantage and the upstream body of catalytic material can then commence to reduce the oxides of nitrogen.

In FIG. 1 P designates an air pump driven by an electric motor M. When valve V1 is opened the air pumped by pump P is supplied to point 21' upstream from chamber 8, while opening of valve V2 will permit the air to be supplied to point 21 upstream from chamber 12. A switch S in the energizing circuit for motor M can be closed to energize the motor and opened at a certain engine speed or at a certain temperature of the catalytic material.

The advantages of the arrangement of the present invention may be summarized as follows:

1. The system provided by the present invention is a combination of aftercombustion by a catalyst and inside a thermal reactor, all occurring in such a small space that the entire unit may be attached directly to the exhaust manifold of an engine.

2. With the device placed close to or directly on the exhaust manifold of the engine the exhaust gases are supplied to the device in a hot condition as soon as possible and the treatment of the exhaust gases thus sets in quite rapidly after starting of the engine.

3. The exhaust gases created at city driving speed are passed 100 percent over the catalyst material and, thus, soon after the cold starting of the engine, are completely detoxified by the device.

4. The chambers for the catalytic material become quickly heated up and will heat up the main flow passage so that at higher engine speeds when the exhaust gases are permitted, in part, to pass along the main flow passage, the thermal reactor provided thereby will already be hot and will effect efficient treatment of the exhaust gases.

5. In a relatively small space entire treatment of the exhaust gases is effected by catalytic treatment and by a thermal reactor, but without any substantial loss of power.

6. The treatment of the gases occurs in three stages. Treatment occurs in the bodies of catalytic material encountered, while inside the thermal reactor combustion occurs; while, at the discharge end of the device, a still further aftercombustion effecting the streams from both the inner and outer channels occurs. There is catalytic treatment in two stages and combustion treatment in the thermal reactor and final afterburning when the two streams of gases combine at the entrance end of exhaust pipe 17.

7. The arrangement provides for a supply of additional combustion air ahead of the device while the engine is cold and then downstream from the catalytic material for the reduction of oxides of nitrogen after the engine becomes hot and with the combustion gas finally being cut off at a certain engine speed or under certain temperature conditions.

Figure 2:
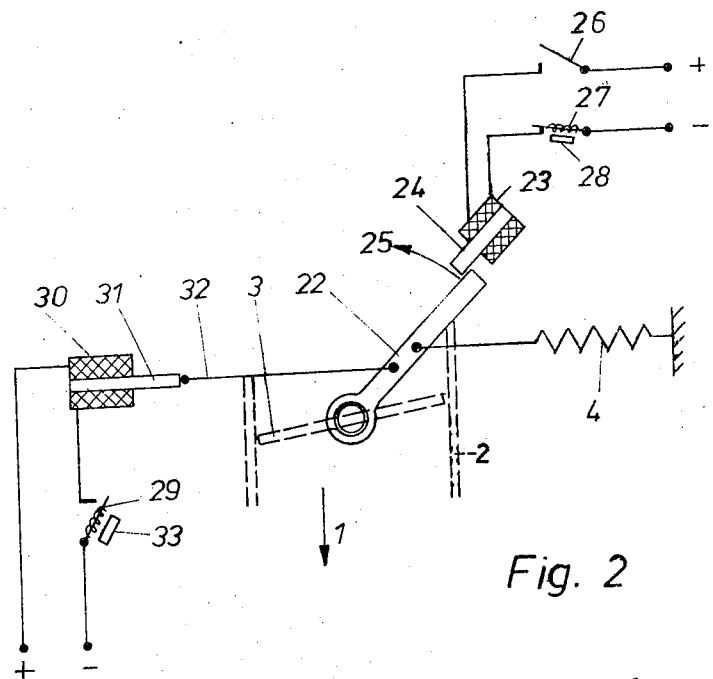
Figure 3:
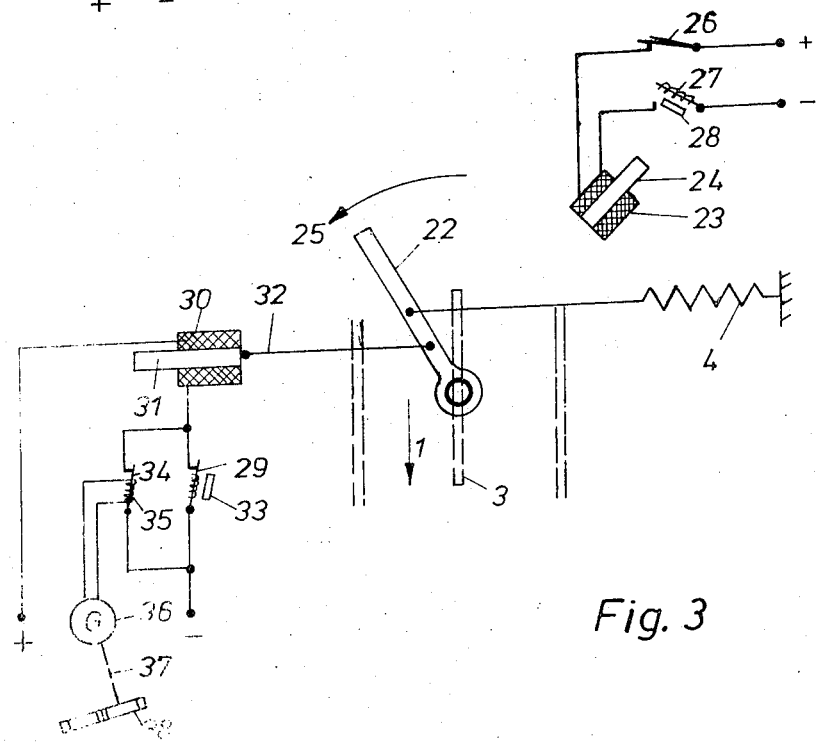

Turning now to FIGS. 2 and 3, in FIG. 2 it will be noted that butterfly valve 3 has an operating arm 22 thereon to which spring 4 is connected. Armature 24, which provides an abutment to hold arm 22 in valve closed position, forms the armature of a solenoid 23 which is in circuit with a switch 26 that closes when the ignition is turned on and a switch 27 which is a normally closed bimetallic element under the control of engine temperature or the cooling fluid of the engine or of the catalytic material, as represented by rectangle 28. Switch 27 is normally closed but when a proper operating temperature of the catalyst, or the engine, is reached, the switch 27 will open, thereby releasing arm 22 from tilting in a counterclockwise direction against the action of spring 4. The valve is thus held closed while the catalyst or engine is cold and is released when operating temperatures are reached so as to be influenced by the upstream gas pressure. FIG. 2 shows armature 24 with coil 23 energized, while FIG. 3 shows the armature with the coil deenergized.

A further armature 31 is connected to arm 22 by a link 32 and this armature is under the control of a coil 30 which is provided for pulling valve 3 open when certain dangerous conditions arise. Coil 30 is in circuit with a bimetallic switch 29 to which heat is supplied, as indicated by rectangle 33, for example, from the catalytic material. When switch 29 closes, indicating an over temperature condition, arm 22 is moved counterclockwise to open valve 3 and thereby to permit substantially all of the exhaust gases to flow in main channel 2 and thus bypass the catalytic material. The control arrangement of FIG. 2 insures that the catalytic material will become fully effective when the engine starts cold, while preventing destruction of the catalytic material in the case of faulty engine operation.

As shown in FIG. 3, bimetallic contact 29 may be bypassed by another bimetallic member 34 adapted for being heated by a coil 35 that is supplied with energy from a tachometer generator 36 driven by shaft 37 and from gearing 38 which may, for example, be connected to an engine drive shaft leading to the wheels of the vehicle. Contact 34 is adapted for closing independently of contact 35 at a certain vehicular speed, thereby avoiding overloading of the catalytic material.

It will be understood that modifications may be made within the purview of the appended claims.

What is claimed is:

1. In a device for the treatment of the exhaust gases of an internal combustion engine; a first member having a central flow channel therethrough for the exhaust gases leaving the engine and having an inlet end and an outlet end, a second member having a second channel therethrough surrounding said central channel and also having an inlet end and an outlet end, a control element carried by said first member in said central channel between said inlet end and outlet end thereof and moveable for varying the effective area of said central channel, passages in said first member connecting said central channel downstream from said inlet end thereof and upstream from said control element with the inlet end of said second channel, said second channel being in heat transfer relation with said central channel via said first member and being adapted for receiving catalytic material, said second channel comprising serially arranged axial spaces in said second member adapted to receive catalytic material, a chamber in said second member between said spaces through which gases flow in moving from the upstream one of said spaces to the downstream one thereof, and mixing elements in said chamber to cause the gases flowing through said chamber to become admixed.

2. A device according to claim 1 in which the upstream one of said spaces is adapted to receive a catalytic material operable for reducing oxides of nitrogen.

3. A device according to claim 1 in which the downstream one of said spaces is adapted to receive a catalytic material operable for effecting the oxidation of carbon monoxide and hydrocarbon.

4. In a device for the treatment of the exhaust gases of an internal combustin engine; a first member having a central flow channel therethrough for the exhaust gases leaving the engine and having an inlet end and an outlet end, a second member having a second channel therethrough surrounding said central channel and also having an inlet end and an outlet end, a control element carried by said first member in said central channel between said inlet end and outlet end thereof and moveable for varying the effective area of said central channel, passages in said first member connecting said central channel downstream from said inlet end thereof and upstream from said control element with the inlet end of said second channel, said second channel being in heat transfer relation with said central channel via said first member and being adapted for receiving catalytic material, each said member at the outlet end of the respective channel tapering inwardly, the outer end of said first member terminating between the ends of the taper at the outlet end of said second member whereby the gas streams from said central channel and said second channel will mix, and protrusion means carried by one of said members and protruding into the path of the gas stream from said second channel in the region where the gas streams mix for promoting intimate mixing thereof.

5. In a device for the treatment of the exhaust gases of an internal combustion engine; a first member having a central flow channel therethrough for the exhaust gases leaving the engine and having an inlet end and an outlet end, a second member having a second channel therethrough surrounding said central channel and also having an inlet end and an outlet end, a control element carried by said first member in said central channel between said inlet end and outlet end thereof and moveable for varying the effective area of said central channel, passages in said first member connecting said central channel downstream from said inlet end thereof and upstream from said control element with the inlet end of said second channel, said second channel being in heat transfer relation with said central channel via said first member and being adapted for receiving catalytic material, said first member including mixing elements protruding inwardly into said central channel and in heat exchange relation with catalytic material in said second channel.

6. In a device for the treatment of the exhaust gases of an internal combustion engine; a first member having a central flow channel therethrough for the exhaust gases leaving the engine and having an inlet end and an outlet end, a second member having a second channel therethrough surrounding said central channel and also having an inlet end and an outlet end, a control element carried by said first member in said central channel between said inlet end and outlet end thereof and moveable for varying the effective area of said central channel, passages in said first member connecting said central channel downstream from said inlet end thereof and upstream from said control emement with the inlet end of said second channel, said second channel being in heat transfer relation with said central channel via said first member and being adapted for receiving catalytic material, means biasing said control element toward a first position thereof in which the effective area of said central channel is a minimum, means for moving said control element toward a second position thereof wherein the effective area of said central channel is a maximum, a blocking element normally locking said control element in said first position, actuator means connected to said blocking element to withdraw the blocking element from blocking position, and temperature sensitive means controlling said actuator.

7. In a device for the treatment of the exhaust gases of an internal combustion engine; a first member having a central flow channel therethrough for the exhaust gases leaving the engine and having an inlet end and an outlet end, a second member having a second channel therethrough surrounding said central channel and also having an inlet end and an outlet end, a control element carried by said first member in said central channel between said inlet end and outlet end thereof and moveable for varying the effective area of said central channel, passages in said first member connecting said central channel downstream from said inlet end thereof and upstream from said control element with the inlet end of said second channel, said second channel being in heat transfer relation with said central channel via said first member and being adapted for receiving catalytic material, means biasing said control element toward a first position thereof in which the effective area of said central channel is a minimum, an actuator connected to said control element and operable to move said control element of a second position thereof in which the effective area of said central channel is a maximum, a switch controlling said actuator, a bimetallic element controlling said switch and in heat exchange relation with said catalytic material, a second switch in parallel to the first mentioned switch, a second bimetallic element controlling said second switch, and a heating element in heat exchange relation with said second bimetallic element and connected in circuit with a generator driven by the engine to which the device is connected whereby said second switch will be actuated by said second bimetallic element at a predetermined speed of said engine.

8. A device according to claim 6 in which said actuator comprises an electromagnetic actuator having a coil, and said temperature sensitive means comprises a temperature sensitive switch in circuit with said coil of said actuator.

9. A device according to claim 6 in which said switch is normally closed and opens in response to a predetermined temperature, and a second switch in series with said temperature sensitive switch which closes when the ignition switch of the engine is turned on, said actuator being in ineffective position when energized and being in effective position when deenergized.

10. A device according to claim 9 in which said temperature sensitive switch includes bimetallic control means in heat exchange relation with one of said catalytic material and the cooling system of the engine.

11. A device according to claim 7 which includes means for supplying air to said exhaust gases upstream from the upstream end of catalytic material in said second channel.

* * * * *

UNITED STATES PATENT OFFICE
CERTIFICATE OF CORRECTION

Patent No. 3,793,830          Dated Feb. 26, 1974

Inventor(s) Paul August

It is certified that error appears in the above-identified patent and that said Letters Patent are hereby corrected as shown below:

Col. 6, line 32, "by" should be --- be ---

Col. 7, line 39, "from" should be --- for ---

Col. 9, line 28 (Claim 6) "emement" should be --- element ---.

Signed and sealed this 18th day of June 1974.

(SEAL)
Attest:

EDWARD M. FLETCHER, JR.
Attesting Officer

C. MARSHALL DANN
Commissioner of Patents